United States Patent
Shastri et al.

(10) Patent No.: US 10,467,598 B2
(45) Date of Patent: Nov. 5, 2019

(54) APPARATUS AND METHOD FOR AUTOMATICALLY CONVERTING NOTE TO ACTION REMINDERS

(71) Applicant: Samsung Electronics Co., Ltd., Suwon-si, Gyeonggi-do (KR)

(72) Inventors: Lokendra Shastri, Bengaluru (IN); Rohini Nookala, Gorantla (IN); Abhanshu Gupta, Barwaha (IN); Kailash Atal, Nagaur (IN); Rajat Tandon, Allahabad (IN); Gladbin David C, Thrissur (IN); Karishma Rajesh Sharma, Mumbai (IN); Sohini Sengupta, Bangalore (IN); Utkarsh Srivastava, Bhopal (IN); Vidushi Chaudhary, Faridabad (IN); Arun Yadav, Bangalore (IN); Vaibhav, Benares (IN); Pratik Vasa, Mumbai (IN); Abhay Goel, Ghaziabad (IN); Anshuka Rangi, Rohtak (IN); Ashwani Kumar, Alwar (IN); Kapil Khatke, Bangalore (IN); Nishu Bansal, Ludhiana (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 462 days.

(21) Appl. No.: 15/143,070

(22) Filed: Apr. 29, 2016

(65) Prior Publication Data
US 2016/0321617 A1    Nov. 3, 2016

(30) Foreign Application Priority Data
Apr. 30, 2015    (IN) ............................ 2235/CHE/2015

(51) Int. Cl.
| | | |
|---|---|---|
| *G06Q 10/10* | (2012.01) |
| *G06F 17/27* | (2006.01) |
| *G06F 17/30* | (2006.01) |

(52) U.S. Cl.
CPC ..... *G06Q 10/1095* (2013.01); *G06F 17/2765* (2013.01); *G06F 17/2785* (2013.01)

(58) Field of Classification Search
CPC ........ G06F 17/28; G06F 1/00; G06F 2101/00; G06Q 10/00; G06Q 99/00
(Continued)

(56) References Cited

U.S. PATENT DOCUMENTS

| | | | | |
|---|---|---|---|---|
| 5,794,050 A | * | 8/1998 | Dahlgren | G06F 17/271 |
| | | | | 717/144 |
| 7,027,975 B1 | * | 4/2006 | Pazandak | G06F 16/3344 |
| | | | | 704/9 |

(Continued)

FOREIGN PATENT DOCUMENTS

| | | | |
|---|---|---|---|
| KR | 10-2004-0054867 A | 6/2004 | |
| KR | 10-2009-0042601 A | 4/2009 | |
| RU | 2509350 C2 * | 3/2014 | ............. G06F 17/27 |

OTHER PUBLICATIONS

Simitsis, Alkis & Skoutas, Dimitrios & Castellanos, Malú. (2008). Natural language reporting for ETL processes. DOLAP: Proceedings of the ACM International Workshop on Data Warehousing and OLAP. 65-72. 10.1145/1458432.1458444. (Year: 2008).*

*Primary Examiner* — Alan S Miller
*Assistant Examiner* — Jay-Ming Wang
(74) *Attorney, Agent, or Firm* — Jefferson IP Law, LLP

(57) ABSTRACT

A method for automatically converting note-to-self to action reminders in an electronic device is provided. The method includes receiving an input comprising at least one word from a user of the electronic device, analyzing an anaphora representation or a deictic representation for each of the at (Continued)

least one word, and generating a reminder based on a context from the anaphora representation or the deictic representation.

16 Claims, 22 Drawing Sheets

(58) Field of Classification Search
USPC .............................................. 705/7.11–7.42
See application file for complete search history.

(56) References Cited

U.S. PATENT DOCUMENTS

| | | | |
|---|---|---|---|
| 8,131,778 B2 | 3/2012 | Golds et al. | |
| 9,626,352 B2 * | 4/2017 | Allen | G06F 17/277 |
| 9,659,005 B2 * | 5/2017 | Ramish | G06F 17/2785 |
| 2006/0206307 A1 * | 9/2006 | Sugihara | G06F 17/279 |
| | | | 704/4 |
| 2011/0314402 A1 * | 12/2011 | Kikin-Gil | G06Q 10/109 |
| | | | 715/772 |
| 2013/0173252 A1 * | 7/2013 | Xiong | G06F 17/28 |
| | | | 704/9 |
| 2013/0238658 A1 * | 9/2013 | Burris | G06Q 50/01 |
| | | | 707/770 |
| 2015/0186504 A1 * | 7/2015 | Gorman | G06F 17/2705 |
| | | | 707/752 |

* cited by examiner

Reference Time: June 10, 2015 at 2 pm

New Event ✗

Input:

John is going to Delhi from London 2nyt. I will meet him thr on the last Tuesday of next month. We plan to have Coffee at 7 in the evening at Starbucks that day.

⬇

John is going to Delhi from London tonight .
I will meet him there on the last Tuesday of next month.
We plan to have coffee at 7 in the evening at Starbucks that day.

| | |
|---|---|
| Action: | Coffee |
| With Whom: | John |
| Location: | Starbucks , Delhi |
| Date: | July 28, 2015 |
| Start : | 7:00pm |

[Add to Calendar] [Edit]

FIG. 7M

APPARATUS AND METHOD FOR AUTOMATICALLY CONVERTING NOTE TO ACTION REMINDERS

CROSS-REFERENCE TO RELATED APPLICATION(S)

This application claims the benefit under 35 U.S.C. § 119(e) of an Indian patent application filed on Apr. 30, 2015 in the Indian Patent Office and assigned Serial number 2240/CHE/2015, of an Indian patent application filed on Apr. 30, 2015 in the Indian Patent Office and assigned Serial number 2235/CHE/2015, of an Indian patent application filed on Mar. 29, 2016 in the Indian Patent Office and assigned Serial number 2235/CHE/2015, and of a Korean patent application filed on Apr. 6, 2016 in the Korean Intellectual Property Office and assigned Serial number 10-2016-0042403, the entire disclosure of each of which is hereby incorporated by reference.

TECHNICAL FIELD

The present disclosure relates to automatically generating reminders. More particularly, the present disclosure relates to a method and an apparatus for automatically converting note-to-self to action reminders in an electronic device.

BACKGROUND

Existing automatic generation of reminders provides reminders based on input text as a note. The method extracts textual information from the user input mainly based on either template or keywords to generate reminders. Accordingly, the information extracted for generating the reminders is restricted to the template or the keywords.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method for automatically converting note-to-self to action reminders in an electronic device base on a semantic representation and a context.

In accordance with an aspect of present disclosure, a method for automatically converting note-to-self to action reminders in an electronic device is provided. The method includes receiving an input comprising at least one word from a user of the electronic device, analyzing an anaphora representation or a deictic representation for each of the at least one word, and generating a reminder based on a context from the anaphora representation or the deictic representation.

In accordance with another aspect of the present disclosure, an electronic device for automatically converting note-to-self to action reminders is provided. The electronic device includes receiving an input comprising at least one word from a user of the electronic device, analyzing an anaphora representation or a deictic representation for each of the at least one word, and generating a reminder based on a context from the anaphora representation or the deictic representation.

In accordance with another aspect of the present disclosure, a computer program product comprising computer executable program code recorded on a computer readable non-transitory storage medium is provided. The computer executable program code, when executed, causes the actions including receiving an input comprising at least one word from a user of the electronic device, analyzing an anaphora representation or a deictic representation for each of the at least one word, and generating a reminder based on a context from the anaphora representation or the deictic representation.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7M shows an example scenario of automatically converting note-to-self to action reminders based on semantic representation according to an embodiment of the present disclosure;

Throughout the drawings, it should be noted that like reference numbers are used to depict the same or similar elements, features, and structures.

DETAILED DESCRIPTION

Figure 1:
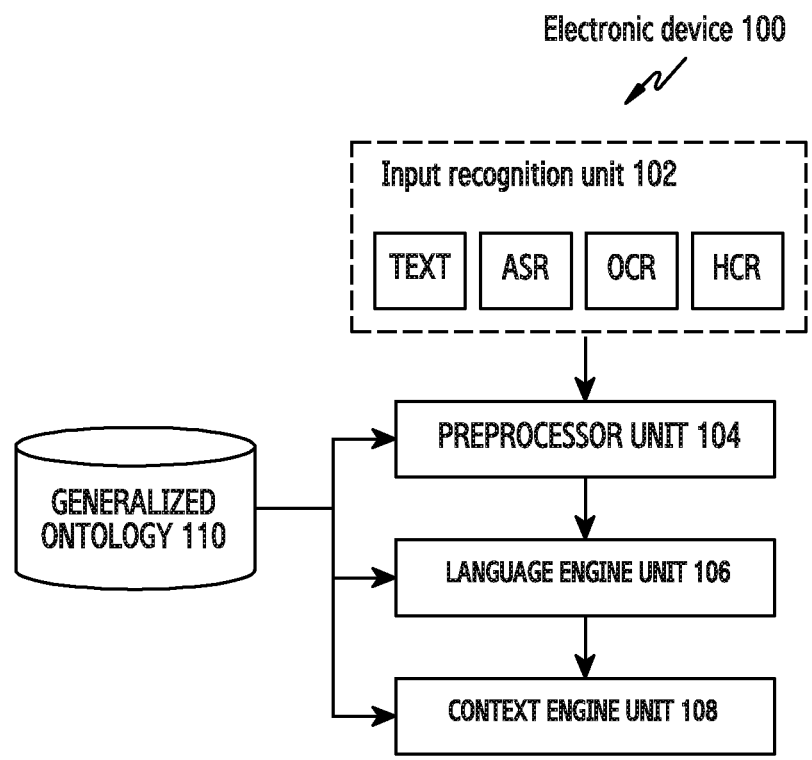
FIG. 1 shows various units in an electronic device for automatically converting note-to-self to action reminders according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein disclose a method for automatically converting note-to-self to action reminders in an electronic device. The method includes receiving, by an input recognition unit, an input from a user of the electronic device. The input is in one of a text form, and a non-text form. Further, the method includes parsing the input, where the input includes at least one of an anaphora representation and a deictic representation. Further, the method includes creating a reminder by resolving at least one of the anaphora representation and the deictic representation.

In an embodiment, creating the reminder includes determining a context from the input.

In an embodiment, determining the context includes converting the input to a canonical representation. Further, extracting information from the canonical representation of the input to generate a plurality of semantic representations. Further, determining the context based on the plurality of semantic representations.

In an embodiment, determining the context based on the plurality of semantic representations includes determining a degree of match between at least two contexts based on at least one parameter. Further, determining the context by merging the at least two contexts of the plurality of semantic representations.

The methods of automatic generation of reminders according to the related art are restricted to extracting textual information from the user input mainly based on either template or keywords to generate the reminders. Unlike methods according to the related art, the proposed method aims to cater constraints of language by not restricting the scope of input to encompass a template or keyword based note, but accepts natural language/free-form text input. The functionality of the proposed method is further extended to solve context related issues. The context related issues links and combines context of a note, spread across multiple sentences in continuity including sets of pronouns, deictic and purpose. The proposed method is useful to users across all demographics with hectic social life, professionals with busy schedules at work place and at home, older people who find difficult to remember tasks.

Referring now to the drawings, and more particularly to FIGS. 1 to 10, where similar reference characters denote corresponding features consistently throughout the figures, there are shown preferred embodiments.

FIG. 1 shows various units in an electronic device 100 for automatically converting note-to-self to action reminders according to an embodiment of the present disclosure.

Referring to FIG. 1, the electronic device 100 consist of an input recognition unit 102, a preprocessor unit 104, a language engine (LE) unit 106, a context engine (CE) unit 108 and a generalized ontology 110. The input recognition unit 102 is configured to receive an input from a user of the electronic device 100. In an embodiment, the input is a text form. In another embodiment, the input is in non-text form. In an example, the textual form can be any of textual information such as alphabets, words, numbers or the like. In an example, the non-textual form can be a voice input. The automatic speech recognition (ASR) is an input recognition method which will convert the voice input into textual information. The other form of inputs recognition methods are optical character recognition (OCR) and hand written character recognition (HCR) method.

The preprocessor unit 104 is configured to convert the input to a canonical representation. In the present disclosure, the canonical representation may be defined as a representation modified from a natural language (such as a chatting language) according to the formal language. For example, the preprocessor unit 104 corrects slang and misspelled words to words in formal language dictionary. The preprocessor unit 104 disambiguates multiple possible corrections for slang and misspelled words based on local context. The preprocessor unit 104 tokenizes one or multi-word segments representing a single unit of entity, activity, spatial location, temporal expression and so on. In the present disclosure, the tokenizing may be defined as a procedure for separating a plurality of word included in a sentence. Further, the preprocessor unit 104 creates a canonical representation for the temporal expression.

The LE unit 106 is configured to extract information from the canonical representation to generate a plurality of semantic representation. In the present disclosure, the semantic representation may be defined as information for a specific word or a specific sentence. The LE unit 106 obtains semi-tokenized sentences from the preprocessor unit 104 as input. Further, the LE unit 106 extracts relevant information from the semi-tokenized sentences including but not limited to activity type, intent, participants, purpose, time, location etc. The LE unit 106 generates a semantic representation for the input sentence and passes to CE unit 108 for further processing. The process of creation of semantic representation is dependent on language construction. But the semantic representation is independent of language construction. The semantic representation depends on semantics of words and how they relate to each other. The examples mentioned below have the same semantic representation.

1. CC Bill is due on $4^{th}$.
2. Need to pay CC bill by $4^{th}$.
3. $4^{th}$ is the last date to settle CC bill.
4. Don't forget to pay for the CC bill by $4^{th}$.
5. Last day to settle CC bill is $4^{th}$.

The LE unit 106 extracts relevant information from any type of natural sentence construction. Some of prominent features of the LE 106 include:

1. Extracting main activity type and its associated activities from the input sentence.
2. Extracting participant list from the input sentence based on their semantic roles with respect to activity including, but not limited to, agents, patients and co-agents. For Example: "John will wish Tom on his anniversary" John is identified as Agent and Tom as patient of activity.
3. Extracting purpose of the activity from the sentence.
4. Extracting time and location of the activity from the sentence.
5. Distinguishing between different times and locations in the same sentence which are unrelated or are discrete. For example: "meet John on Monday at 4 pm and Tuesday at 6 pm". The proposed method distinguishes the above sentence to "meet John on Monday at 4 pm and meet John on Tuesday at 6 pm". Here, based on the identified different times, reminders will be set accordingly for different times 4 pm and 6 pm.
6. Inferring and extending common temporal or spatial expression across two unrelated instances in the same sentence. For example: "let's meet John on Mondays and Tuesdays at 6 pm", where 6 pm is inferred as common time for both the meeting timings and is propagated in each object.
7. Inferring the semantic interpretation of the sentence and converting activity type on that basis. For example: "I will see John on Monday", the activity type will be changed to 'meet' from 'see'.
8. Extracting intent from the sentence including question, proposal, informing and so on.
9. Extracting tense information from the sentence.

The CE unit 108 is configured to determine a context based on the plurality of semantic representations. In the present disclosure, the context may be defined as information derived from a given sentence or a given word within the sentence or external the sentence. The CE unit 108 captures and stores the context within a note. Further, the CE unit 108 resolves the anaphora and deictic in a sentence and also performs temporal and spatial reasoning among other functionalities.

The generalized ontology 110 is a knowledge base, which consists of varied information like slang dictionary, occasion dictionary, entity and role names and so on related to a specific domain. It also stores information like Lexicons (words and their parts of speech (POS) tags, frequency of occurrence or the like.), word mapping (mapping of words to semantic concepts) and so on. The generalized ontology 110 is accessed by modules for different kinds of information and data. Further, the generalize ontology 110 also captures knowledge about some domain of interest primarily by describing the concepts in the domain and also the relationships that hold between those concepts. For example: the slang dictionary will have entries like "Tmrw for tomorrow" which can be used by the preprocessor unit 104. Further, roles for gender allocation and spatial information including spatial relations and so on are used by the CE unit 108.

FIG. 1 shows a limited overview of the electronic device 100 but, it is to be understood that other embodiments are not limited thereto. The labels or names of the units are used only for illustrative purpose and does not limit the scope of the present disclosure. Further, the electronic device 100 can include any number of units or sub-units communicating among each other along with the other components. Likewise, the functionalities of one or more units can be combined by a single unit or can be distributed among each other in a manner different than described herein without departing from the scope of the present disclosure.

Figure 2:
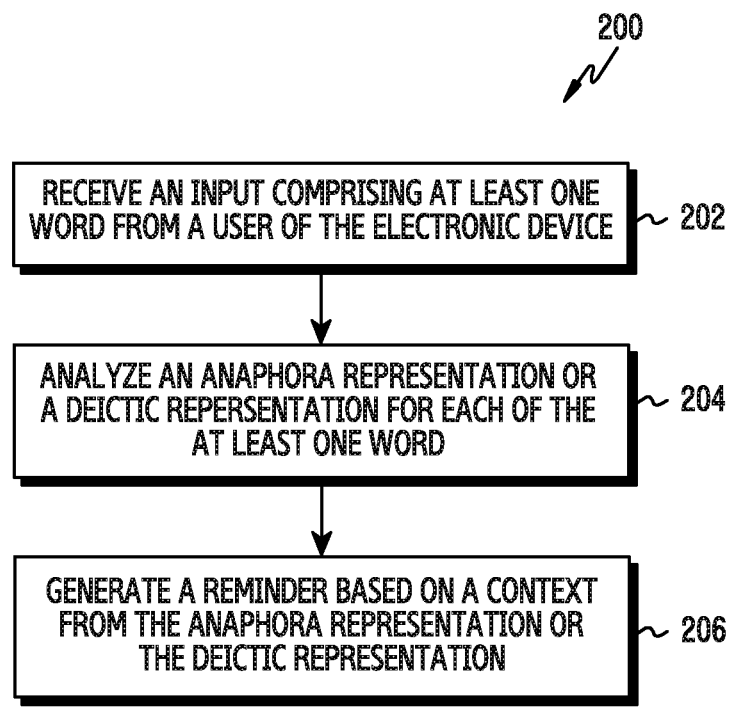
FIG. 2 is a flow diagram illustrating a method for generating reminders according to an embodiment of the present disclosure.

FIG. 2 is a flow diagram illustrating a method 200 for generating reminders according to an embodiment of the present disclosure.

Referring to FIG. 2, at operation 202, the electronic device 100 receives an input comprising at least one word from a user of the electronic device. The method for receiving the input may be various according to an implement. For example, the electronic device 100 may receive the input by using the voice recognition, OCR, or HCR.

At operation 204, the electronic device 100 analyzes an anaphora representation or a deictic representation for each of the at least one word. More details for analyzing the anaphora representation or the deictic representation is described in FIG. 4.

At operation 206, the electronic device 100 generates a reminder based on a context from the anaphora representation or the deictic representation. By using the method, the user of the electronic device 100 may identify the reminder more accurately.

Figure 3:
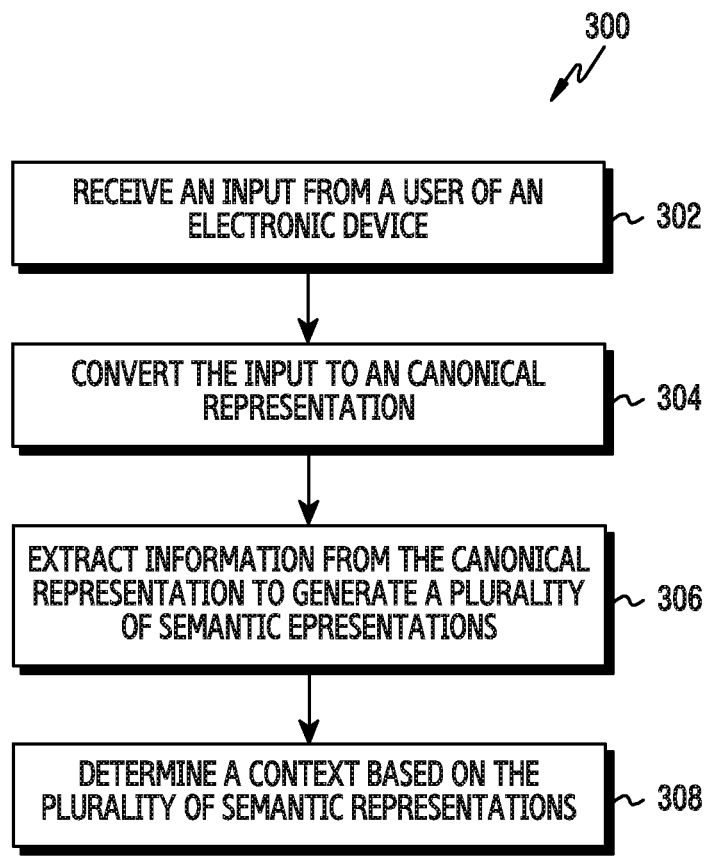
FIG. 3 is a flow diagram illustrating a method for determining a context based on the plurality of semantic representations according to an embodiment of the present disclosure.

FIG. 3 is a flow diagram illustrating a method 300 for determining a context based on the plurality of semantic representations according to an embodiment of the present disclosure.

Referring to FIG. 3, at operation 302, the method 300 includes receiving an input from a user of the electronic device 100. In an embodiment, the input is a text form. In another embodiment, the input is in non-text form. The method 300 allows the input recognition unit 102 to receive an input from a user of the electronic device 100. In an example, the input can be textual information or a voice input.

At operation 304, the method 300 includes converting the input to a canonical representation. The method 300 allows the preprocessor unit 104 to convert the input to a canonical representation. In an example, converting the input Wed to Wednesday.

At operation 306, the method 300 includes extracting information from each of the canonical representation of the input to generate a plurality of semantic representations. The creation of semantic representation is based on syntax of language and semantics of lexical words in coherence with each other in a sentence. The method 300 allows the LE unit 106 to extract information from the canonical representation to generate a plurality of semantic representations. In an example, the relevant information includes but not limited to activity type, intent, participants, purpose, time, location or the like.

At operation 308, the method 300 includes determining a context based on the plurality of semantic representations. The method 300 allows the CE unit 108 to determine the context based on the plurality of semantic representations. Consider an example: "John is going to London. I have to meet him there next week". In this case, the location of the meeting in the example will get resolved to "London" and the participants to "User (of note to self (N2S) or electronic device 100") and "John". Time of the meeting will be kept as an open interval starting on the first day, and ending on the last day of the coming week with respect to reference time. The reference time can be user input time.

Figure 4:
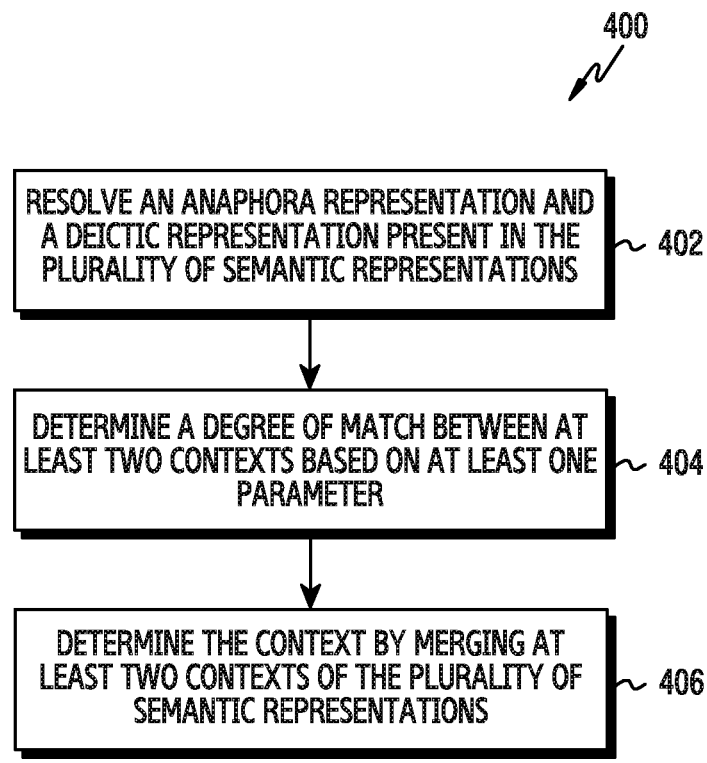
FIG. 4 is a flow diagram illustrating a method for determining a context by merging at least two contexts of the plurality of semantic representations according to an embodiment of the present disclosure.

FIG. 4 is a flow diagram illustrating a method 400 for determining a context by merging at least two contexts of the plurality of semantic representations according to an embodiment of the present disclosure.

Referring to FIG. 4, at operation 402, the method 400 includes resolving an anaphora representation and a deictic representation present in the plurality of semantic representations. The method 400 allows CE unit 108 to identify an anaphora representation and a deictic representation present in the plurality of semantic representations.

The CE performs the anaphora and deictic resolutions according to the following operations:

Resolution of Deictic in Purpose: The CE unit 108 identifies a deictic. Further, the generalized ontology 110 is queried to return a list of contexts which contain purpose information. Further, the most recent contexts are extracted and their purpose fields are assigned to the purpose field of the current context.

Resolution of Deictic in Spatial: The CE unit 108 identifies the presence of deictic and the level of deictic association. For example: "I will meet you in that City", deictic is associated with the spatial level city. Then the generalized ontology 110 is queried to return the contexts which contain a non-empty spatial field. Further, the most recent matching context with the same spatial level is extracted and it is assigned to the spatial field of the current context.

The Resolution of deictic in temporal is split into different modules as follows:

Resolution of occasion deictic: The occasions are split into occasion types. For example: Food occasions and Yearly festive occasions. For food occasions, the temporal information associated with all "Date' based fields is extracted from the matched context and filled into the current context for resolving the deictic. For other occasion types, the "Year" info is extracted from the matched context. In an example, "Ram is coming to Bangalore in 2016. Shyam will meet him that Christmas" Here, "that Christmas" refers to the Christmas of 2016.

In another example, "Ram was in Bangalore on 16th January. We had lunch together. That lunch was excellent." Here, "that lunch" refers to lunch on 16th January.

Resolution of other temporal deictic: In case of other temporal deictic, appropriate temporal values are obtained from the matched context and filled into the temporal object of the input context. In an example, "Ram is coming to town in January 2015. He will meet me that 16th". Here, "that 16th" refers to 16 Jan. 2015.

Resolution of Anaphora and deictic for Participants: A scoring based model is implemented for resolution here. The various parts of the algorithm are as follows. There is no chronology for the algorithm to be followed.

Resolving first and second person pronouns: The pronouns: I, me, myself, you, yourself are independent of previous contexts and are resolved right at the beginning into user information. For "we", the resolution is into the user and some third participant that have been spoken of earlier ("Tom is coming to Bangalore tomorrow. We will meet up on 15th").

Gender Matching. The first important criterion is gender matching by using the generalized ontology 110. Various entities are assigned genders using the generalized ontology 110. In case, the ontology doesn't have an entity, the LE unit 106 assigns the entity to a participant. This is still kept in contention for resolution.

Cardinality Matching. The other important criterion is Cardinality Matching by considering the number during resolution. In the present disclosure, the cardinality may be defined as a number of components belonging to a specific set. References made in the 'plural sense' may map to multiple entities and 'singular sense' may map to a single entity.

Distance Depreciation: There is a factor by which the score keeps on reducing as the context operations keeps on going back. If all other factors are the same, the participant's last mentioned context will get the highest score.

Location Inference: There is inference made by the CE unit 108 on the basis of travel information that has been mentioned by the user. This is done by maintaining the details of travel information such as source, destination, travel start date, end date and so on. This information is maintained for various individuals that have been mentioned by the user. Ex: "Mary will call me. Susan is going to Pune from 12th to 18th. I will meet her in Bangalore on 15th." Here, there are two contenders for "her": Mary and Susan respectively. The electronic device 100 resolves "her" to "Mary" because "Susan" is not in Bangalore on 15th. This knowledge is obtained from the travel information derived by one or more specified rules.

Gender Table maintenance: In cases, when the electronic device 100 encounters entities unknown in the generalized ontology 110, and there is a desire to resolve an anaphora or deictic uniquely, the information may be kept intact by storing the same in a "gender table". Corresponding to each user, one such table is maintained to ensure consistency. In an example, "Tiberius is coming to town. He will meet me". Suppose Tiberius is not present in the ontology. The pointer "he", due to lack of other contenders, will still have to be resolved into "Tiberius". Further, the information that Tiberius is a "male" is also maintained separately in the "gender table", so that in the future, a female reference doesn't get resolved into "Tiberius".

At operation 404, the method 400 includes determining a degree of match between at least two contexts based on at least one parameter. In an embodiment, the parameters include activity, participants, time, location, purpose or the like and their combinations thereof. The method 400 allows the CE unit 108 to determine the degree of match between at least two contexts based on the compatibility across activity, participants, time, location, purpose, etc. and their combinations thereof.

The semantic representation generated by LE unit 106 for each sentence is analyzed by the CE unit 108 and/or merged with the context of the same note. Upon retrieving a list of matched contexts, a suitable match is identified based on different dimensions. A score which indicates the "degree of match" between two variables is generated for each dimension based on compatibility. In case, some alternate intent or rejection is implied in the input, a high score will be returned even if compatibility is low. Based on the score returned by the sub modules (not shown) of CE unit 108, a Composite Score is formed. The best scored context is identified as the matched context based on a threshold value. The various dimensions are described below:

Temporal Matcher: The electronic device 100 performs the matching on the temporal field in the input sentence against the temporal field in all matched contexts. It identifies a score based on the degree of match between the two temporal fields. In an example, "I am going to meet John on Sunday. I will meet him at Starbucks at 10 AM." 'Sunday and '10 AM' is a potential match.

Spatial Matcher: The electronic device 100 identifies a score based on the degree of match between the two spatial fields. In an example, "I am going to Whitefield on Sunday". "Meeting with John at Phoenix Mall then". The electronic device 100 identifies "Phoenix Mall" as a location in "Whitefield". Thus 'Whitefield' and 'Phoenix Mall' is a match.

Participant Matcher: The electronic device 100 performs the matching on the Participants across matched contexts. In an example, "Meeting with John at the Forum on Sunday". "He will reach Forum at 9 AM". Here, "he" is resolved to "John". These sentences are a potential match based on participants.

Purpose Matcher: The electronic device 100 identifies a score based on the degree of match between the two Purpose fields. In an example, "Discussion with John on Friday". "I will discuss the X Company's proposal then". 'X Company's proposal' and an (empty) topic of discussion is a potential match.

Occasion Matcher: The electronic device 100 performs the matching on the occasion field in the input sentence against matched context occasion field. In an example, "John's Marriage is on Jun. 13, 2015". "Attend his wedding"→"John's Marriage is on Jun. 13, 2015. Attend his wedding". These sentences match as per the occasion compatibility between "marriage" and "wedding".

DoWhat Matcher: The "DoWhat" field defines the object of the main action. The "DoWhat" matcher will perform the matching on the DoWhat field in the input sentence against the DoWhat field in other matched contexts. In an example, "I have applied for Passport". "I will receive it tomorrow". Here, the DoWhat of the "applied" activity is "passport" and "receive" activity is "it". "Here, "it" is resolved to "passport". Thus, these sentences are a potential match based on DoWhat fields".

Gap Filling: The gap filling is used to fill the missing information into the sentence in the semantic representation based on the context of note (time stamp of note, user info etc.) and semantic representation of other sentences in the note.

Default participant gap filling. The Default participant gap filling is performed according to the example as follows:" John will be in Total Mall. Remind to meet him" ("I/Me" added as a participant in the semantic representation of second sentence).

Spatial gap filling. If the sentence has activities which require some spatial location and it is not present, then the spatial location gap can be identified by looking at some previous contexts if it is compatible. In an example, "I am going to Pune." I will meet Tom."→"I am going to Pune. I will meet Tom." ("Pune" added as a location in the semantic representation of second sentence).

Temporal gap filling. In an example, "John's birthday is on 25th. Remind me to call him" ("25th" added as temporal information in the semantic representation of second sentence).

At operation 406, the method 400 includes determining the context by merging at least two contexts of the plurality of semantic representations. The method 400 allows the CE unit 108 to determine the context by merging at least two contexts of the plurality of semantic representations.

The matched contexts are merged and updated in the context storage structure. There are 4 primitive types of attribute merge operations explained as below:

Append: Current attribute values are appended in matched context attribute values. The append operation depicts as below:
 Matched Context: I will meet Mary
 Input Context: will meet Tom also.
 Here APPEND operation will results in participants I, Mary and Tom.

Override: Current attribute values are override to matched context attribute values.
 E.g.: Matched Context: I will meet you at 5 pm
  Input Context: no, make it 6 pm.
 Here OVERRIDE operation will results in Temporal Location: 6 pm (5 pm is overridden by 6 pm)

Negate: Current attribute values are removed (if present) from matched context attribute values.
 E.g.: Matched Context: I will meet Mary and Tom
 Input Context: Tom will not come.
 Here NEGATE operation will results in participants: I and Mary (Tom is removed from final list)

No Change: Current attribute values are not merged with matched context attribute values
 E.g.: Matched Context: Can we meet on 5th?
  Input Context: I will let you know tomorrow The temporal information contained in the input context should not be merged into the matched context. Each attribute is processed by a specific updater as defined below:

Temporal Updater: The temporal updater interfaces with the Temporal Reasoner to process input temporal objects created by the LE unit 106.

The append operation for the two input durations in temporal object causes them to be merged and then processed.

The override operation checks the structure and levels within the duration objects to merge the two to create a compatible merged duration object, which is then processed to get the temporal result.

For negation operation, the CE unit 108 simply maintains a flag to signal that a particular field in the semantic representation is invalidated (e.g., activity, time, participants, location, purpose or the like) and indicates that it could be overridden with higher probability in the future.

AM/PM Resolution Criteria: The temporal updater resolves AM/PM values on the fields based on the activity type and temporal result. In an example, "Meeting on 5th with Mary at office at 2". The CE unit 108 infers that, the meeting is more likely to happen at 2 PM than at 2 AM even though the user did not mention AM/PM information explicitly. Hence the temporal result is updated as 2 PM on 5th. This type of am/pm resolution is resolved in absence of evidence about the meridian of hour-minute time.

Spatial Updater: For spatial objects merging is done based on the levels like Country, State, City, Establishment, and Sub-establishment. The level information of known spatial locations is accessed from the generalized Ontology 110. Also the range that is Local, Domestic, and International is inferred from the levels present in the final spatial object.

Participant Updater: Each operation is carried out on the various participant lists-Agent List, Patient List, and Other Lists.

Participants are added into the list if not already present in append operation.

Negate removes the participant from the list.

Override removes up the last added participants by retrieving that information from context history, and adds the participants in this input.

Temporal Reasoner (as a standalone component) deals with complex temporal structures to provide with a List of result objects (RO). And each of these ROs contains:
1. Date
2. Time
3. Time Interval
4. Open v/s Closed Interval of the Duration
5. Recurring Multi-Level Result; based on information extracted from the input structure. Besides these, it also functions in checking inconsistency in date-time compatibility in the input sentence Goof Up flag.

In an example, let's meet during every Friday for 8 hours from $1^{st}$ February till 28 Feb. 2016.

Temporal RO:
RO Level-1
Start time: 01-02-2016 00:0
End Time: 28-02-2016 23:59
Recurrence Hop: P1W
Recurrence Type: AND
RO Level-2
Start time: 06-02-2016 00:00
End Time: 06-02-2016 23:59
Interval: PT8H In the above example, the processing of the input produces a 2-Level Recurrent result. The RO level-1 signifies the outer bound/Interval in which the recurrence can occur. The hop signifies a jump period of weekly (P1W=one-weekly), i.e. the inner RO level-2 occurs in every 1 week time interval within the range boundary. The recurrence over Friday is signified by setting a single instance (the first recurrent instance) of Friday in the outer boundary duration. The type of every meeting v/s meeting sometimes is differentiated by: AND/OR/XOR type setting. Here 'every' signifies: AND setting. The Duration of meeting is updated on RO Level-2 where the interval is 8 Hours (=PT8H) which can occur anytime on Friday.

Figure 5:
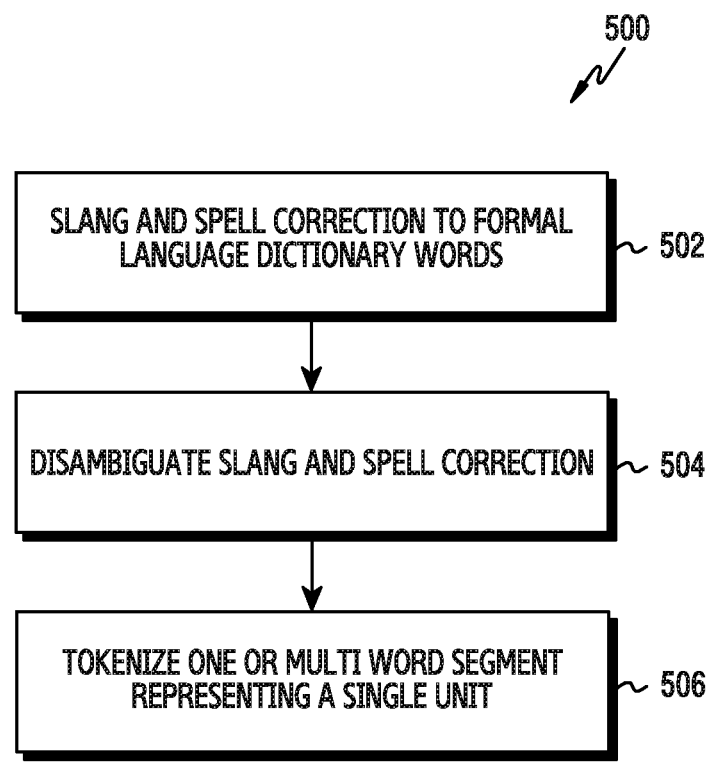
FIG. 5 is a flow diagram illustrating a method for note-to-self preprocessing according to an embodiment of the present disclosure.

FIG. 5 is a flow diagram illustrating a method 500 for note-to-self preprocessing according to an embodiment of the present disclosure. The method 500 explains preprocessing of text using the preprocessor unit 104 for extracting of temporal information. The N2S preprocessing of text includes the following operations as shown below:

Referring to FIG. 5, at operation 502, the method 500 includes slang and spell correction to formal language dictionary words. The method 500 allows the preprocessor unit 104 to correct the slang and spelling to formal language dictionary words. In an example, "2mrw", "tmrw", "tomor-rowwwwwwwww", "tommorow", etc. are corrected to "tomorrow").

At operation 504, the method 500 includes disambiguation of slang and spell correction. The method 500 allows the preprocessor unit 104 to disambiguate slang and spell correction based on local context of preceding and succeeding words. For example: "on January 4 4 4 hours" is corrected to "on January 4 for 4 hours"; "in January 4 dinner" is corrected to "in January for dinner"; "between March 2 2 April 2" is corrected to "between March 2 to April 2"; "morning 2 noon" is corrected to "morning to noon".

At operation 506, the method 500 includes tokenizing one or multi word segments representing a single unit. The method 500 allows the preprocessor unit 104 to tokenize one or multi word segment representing a single unit. In an example, "I will meet John in United States of America", here "United States of America" represents a single unit all though it is a combination of multiple consecutive words.

In an embodiment, the tokenizing one or multi word segments is based on the temporal expression identification. In an example, the preprocessor unit 104 identifies temporal expression such as but not limited to:
1. Calendar dates (in different locale, with preference to locale of user location, if known)
2. Hour-minute time (in 12 and 24 hour format)
3. Relative time (e.g. tomorrow, now etc.)
4. Idiom like temporal expressions (e.g. "see you in 5" meaning "see you in 5 minutes")
5. Language dependent construction for temporal expression (e.g. "quarter past 3" meaning "3:15"; "at 5 to 7" meaning "6:55") where the meaning of individual words is different from the meaning of words together as a whole
6. Part of a day (e.g. morning, noon, evening etc.)
7. Names of days of week
8. Names of months of year
9. Names of seasons
10. Names of festivals and national holidays
11. Names of food occasions (e.g. lunch, brunch, coffee, etc.) which may or may not have an associated time with it
12. Names of occasions (e.g. birthday, marriage, etc.)
13. Duration specifying length of an interval on timeline (e g millennium, century, decade, year, quarter, month, fortnight, week, day, hour, minute, second, etc)
14. Recurrence associated with each of the aforementioned temporal expressions.
15. Modifiers associated with each of the aforementioned temporal expressions (e.g. ordinal and cardinal numbers; determiners: a, an, the, some, etc.; deictic: this, that, these, those, etc.; relative operations: next, last, subsequent, alternate etc.; fractional modifiers: early, mid, late etc.; other modifiers: more, less, half, double, etc. but not limited to these modifiers only).

In an embodiment, the preprocessor unit 104 converts the identified temporal expression to the canonical representation. In an example, "see u in 5" converted to "see you in 5 minutes".

Figure 6:
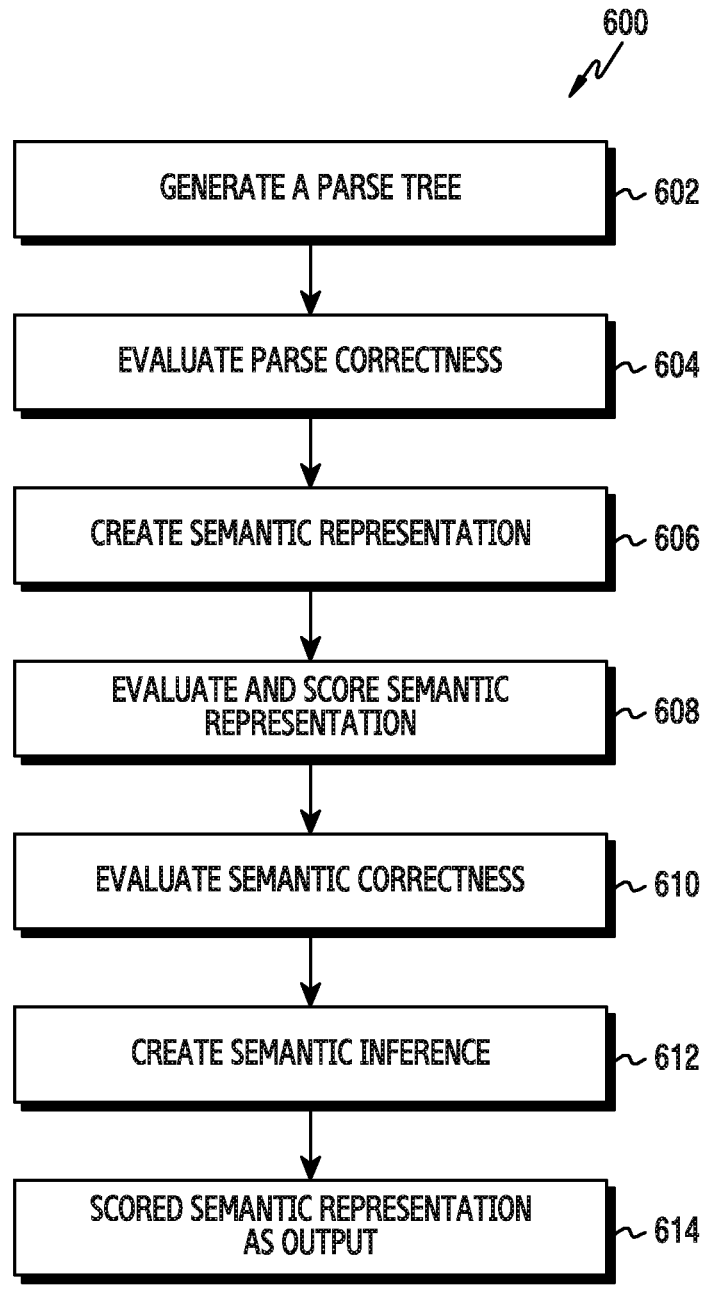
FIG. 6 illustrates a functional flow diagram of a language engine (LE) unit according to an embodiment of the present disclosure.

FIG. 6 illustrates a functional flow diagram of a LE unit 106 for extracting the information from tokenized sentences according to an embodiment of the present disclosure.

Referring to FIG. 6, at operation 602, the method 600 includes generating a parse tree. The method 600 allows generating a parse tree. For each canonical representation created by the preprocessor unit 104, multiple parses are used to generate syntactic representation (parse trees). Further, each parse tree is examined separately to create semantic representation.

At operation 604, the method 600 includes evaluating parse correctness. The evaluation of parse tree involves the following operations:

a. Apply grammar based rules to evaluate the correctness of the parse by assigning scores to each parse. Only the parses above a threshold score are considered for further processing.

b. All the n-grams tokenized by preprocessor are un-tokenized.

c. Based on different syntactic categories of each word in the sentence, multiple semantic representations of each word are obtained.

At operation 606, the method 600 includes creating a semantic representation. The LE unit 106 uses the multiple semantic representations of the word and generates combination of the semantic representation based on the score. Further, for every semantic representation of the word, semantic objects are created.

At operation 608, the method 600 includes evaluating and scoring semantic representation. The LE unit 106 generates independent scored semantic representation for each combination by linking and scoring semantic objects using linking rules. Different set of linking rules are invoked based on language constructions. Each linking rule creates semantic links between the semantic objects. The process of invoking linking rules involves following operations:

i. A pair of parent and child with the required relation is identified.

ii. Semantic category of parent and child are checked for compatibility. If parent and child are compatible semantically, then a semantic relationship between them is created.

iii. If syntactic parent and child are incompatible, parser correction rules are applied to identify appropriate semantic parent and create a semantic relationship between parent and child.

iv. This process will be continued in sequence till all such pairs are associated with semantic relations.

All the linking rules are written specific to relations between parent and child and the semantic category of parent and child. A score is assigned to the semantic link based on the compatibility. The following features are considered in the linking rules.

v. Semantic distinctions between different relations including but not limited to after, before, between, at, on, over etc.

vi. Interpreting cardinal numbers using different prepositions. E.g. In "at 9", '9' will be treated as hour. In 'on 9', '9' will be treated as date. This is the default interpretation in absence of any evidence for the other interpretation.

vii. Extraction of deictic, determiners and recurrence from the temporal expressions.

viii. Creation of language independent semantic representation.

ix. Inferring temporal relations even when there is no explicit preposition.

x. Inferring and extending common temporal expression across two unrelated temporal Instances in the same sentence. The example includes but is not limited to sentence like "lets meet John on Mondays and Tuesdays at 6 pm", where 6 pm is inferred as common time for both the meeting timings and is propagated in each object.

At operation 610, the method 600 includes evaluating semantic correctness. After the creation of semantic representation, semantic rules are invoked to check the semantic correctness of the generated semantic representation and are assigned scores based on the semantic rules.

At operation 612, the method 600 includes creating semantic inference. The semantic inference rules are invoked for activity conversion, tense information extraction and intent extraction. In an example, "I will see John tomorrow", here "see John" Semantically means "meet John" but not "look at John".

At operation 614, the method 600 includes passing scored semantic representation as output. Once all the processing is completed, the scored semantic representation is passed on as input for CE unit 108.

Figure 7A:
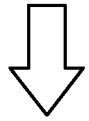
FIG. 7A shows an example scenario of converting user input into a canonical representation, according to an embodiment as disclosed herein.

FIG. 7A shows an example scenario of converting user input into a canonical representation according to an embodiment of the present disclosure.

Referring to FIG. 7A, the reference time is Jun. 10, 2015 at 2 pm. When the user of the electronic device 100 inputs textual information on a note, the preprocessor unit 104 analyses the input text (e.g., "John is going to Delhi from London 2nyt") for slang or spell correction. Further, the preprocessor unit 104 converts the textual information into canonical representation (e.g., "John is going to Delhi from London tonight") free from errors as shown in FIG. 7A.

Figure 7B:
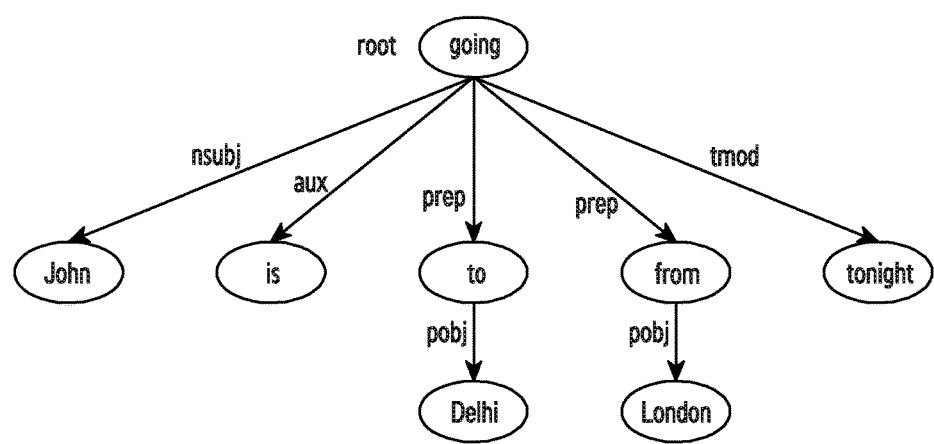
FIG. 7B shows an example scenario of syntactic parsing according to an embodiment of the present disclosure.

FIG. 7B shows an example scenario of syntactic parsing according to an embodiment of the present disclosure.

Referring to FIG. 7B, the canonical representation of input text is parsed by a syntactic parser (not shown). The syntactic parser extracts and links the different lexical entries based on the relationship between them. The syntactic parser parses the input text "John is going to Delhi from London tonight" and represents it in the form of a parse tree as shown in FIG. 7B.

Figure 7C:
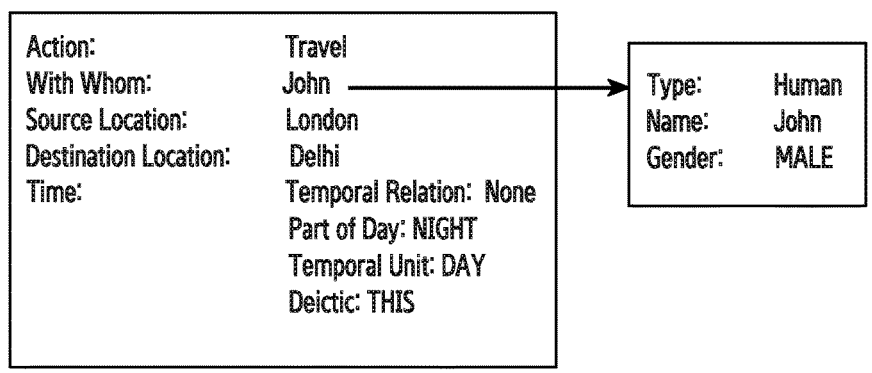
FIG. 7C shows an example scenario of semantic representation creation according to an embodiment of the present disclosure.

FIG. 7C shows an example scenario of semantic representation creation according to an embodiment of the present disclosure.

Referring to FIG. 7C, the LE unit 106 uses the relationships among the different lexical entries and generates a semantic representation.

Figure 7D:
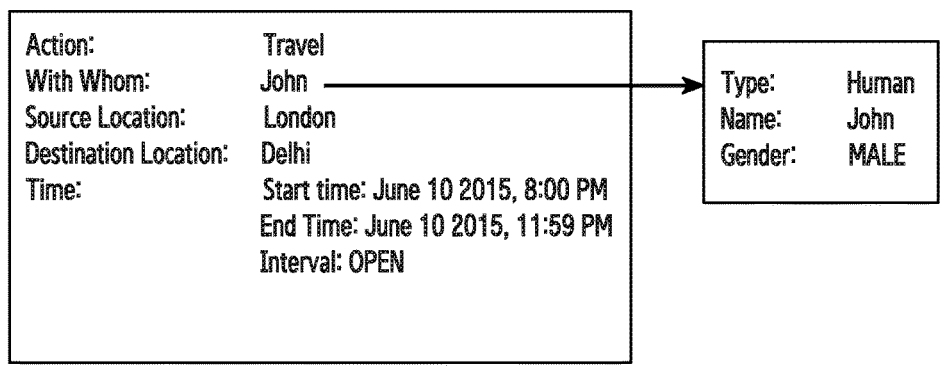
FIG. 7D shows an example scenario of context extraction according to an embodiment of the present disclosure.

FIG. 7D shows an example scenario of context extraction according to an embodiment of the present disclosure.

Referring to FIG. 7D, The CE unit 108 receives semantic representation from the LE unit 106 to disambiguate the ambiguous sentence, phrases in context. Further, the CE unit 108 generates appropriate semantic interpretation as shown in FIG. 7D. For example, as illustrated in FIG. 7D, the CE unit 108 converts the temporal information 'tonight' to 'from Jun. 10, 2015, 8:00 pm to Jun. 10, 2015, 11:59 pm' in order to specify the semantics of the input.

Figure 7E:
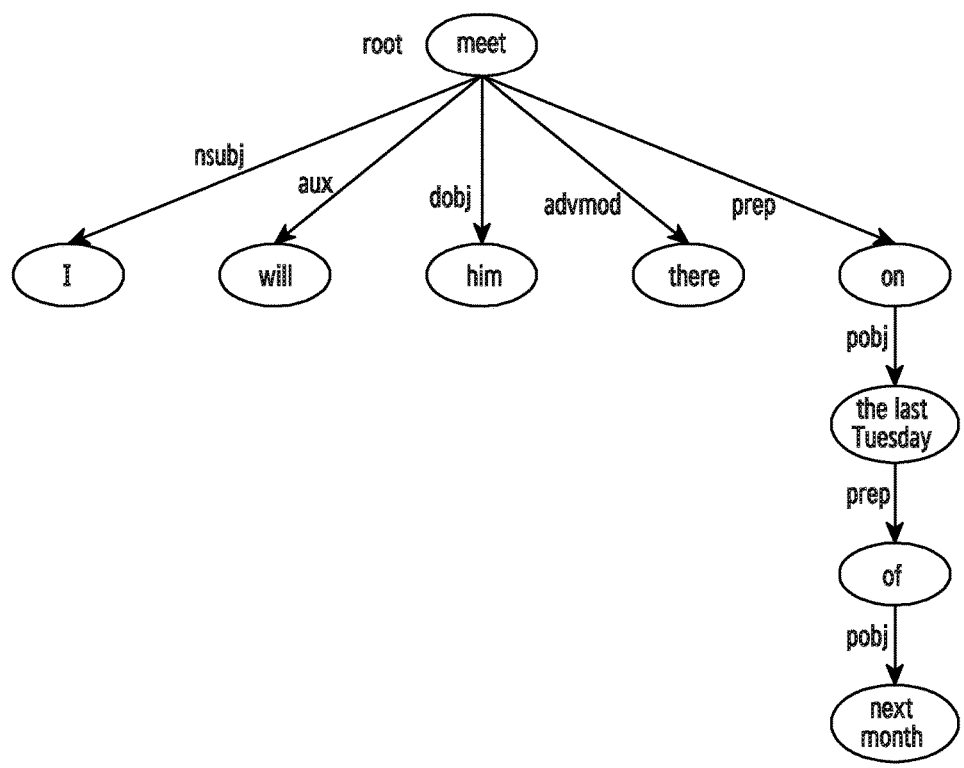
FIG. 7E shows another example scenario of syntactic parsing according to an embodiment of the present disclosure.

FIG. 7E shows another example scenario of syntactic parsing according to an embodiment of the present disclosure.

Referring to FIG. 7E the syntactic parser generates a parse tree for the second sentence in the note "I will meet him there on the last Tuesday of next month". Further, the syntactic parser extracts and links the different lexical entries based on the relationship between them.

Figure 7F:
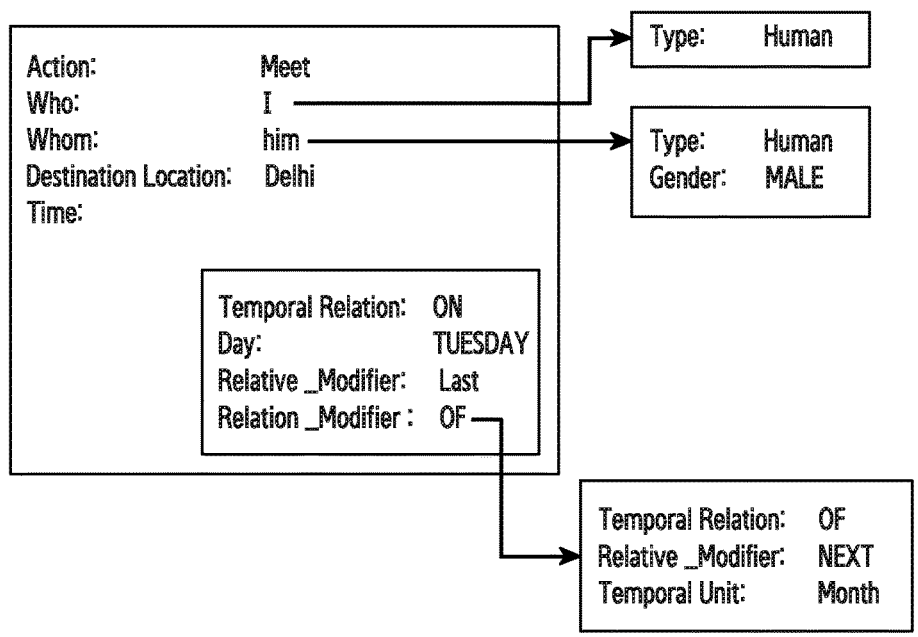
FIG. 7F shows another example scenario of semantic representation creation according to an embodiment of the present disclosure.

FIG. 7F shows another example scenario of semantic representation creation according to an embodiment of the present disclosure.

Referring to FIG. 7F, the LE unit 106 uses the relationships among the different lexical entries and generates a semantic representation.

Figure 7G:
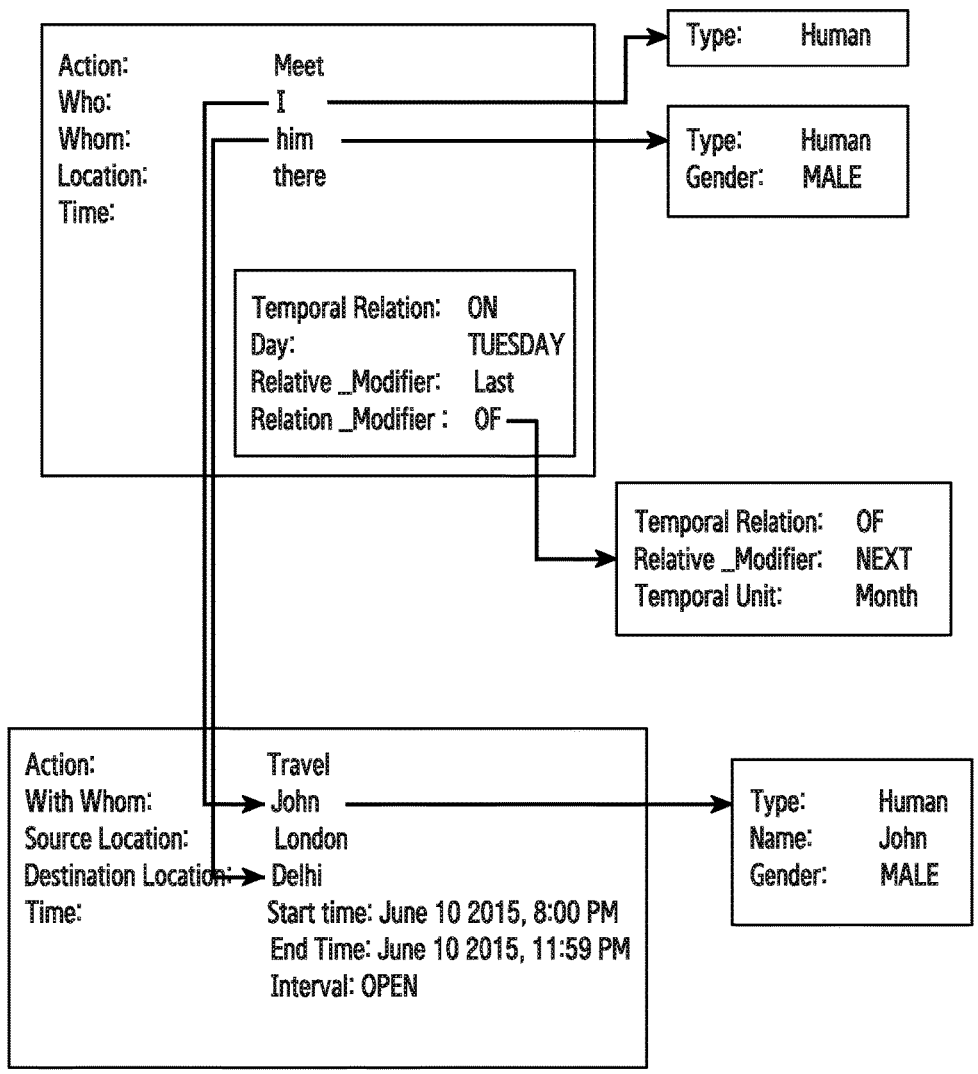
FIG. 7G shows an example scenario of merging semantic representation according to an embodiment of the present disclosure.

FIG. 7G shows an example scenario of merging semantic representation according to an embodiment of the present disclosure.

Referring to FIG. 7G, the CE unit 108 merges the plurality of semantic representations (i.e. a semantic representation for 'John is going to Delhi from London tonight' and 'I will meet him there on the last Tuesday of next month') to generate an appropriate semantic interpretation.

Figure 7H:
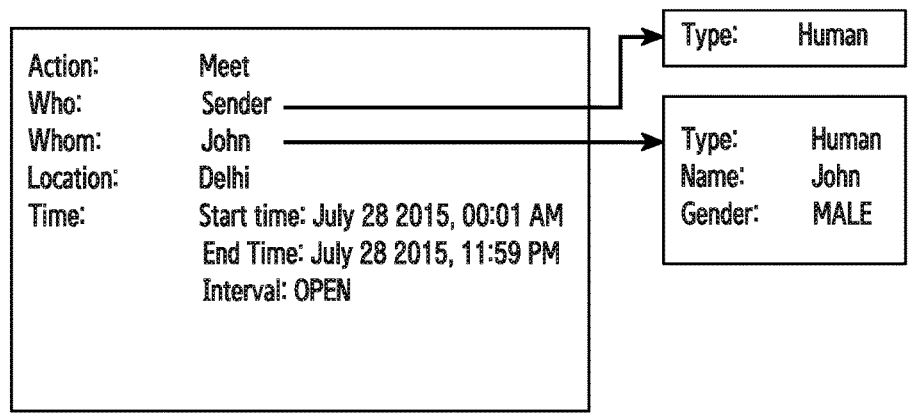
FIG. 7H shows another example scenario of context extraction according to an embodiment of the present disclosure.

FIG. 7H shows another example scenario of context extraction according to an embodiment of the present disclosure.

Referring to FIG. 7H, the CE unit 108 extracts contextual information from the generated semantic representation. For example, as shown is FIG. 7H, the CE unit 108 may extract the 'type' for the 'sender' as the 'human' and the 'gender' for the 'John' as the 'male'.

Figure 7I:
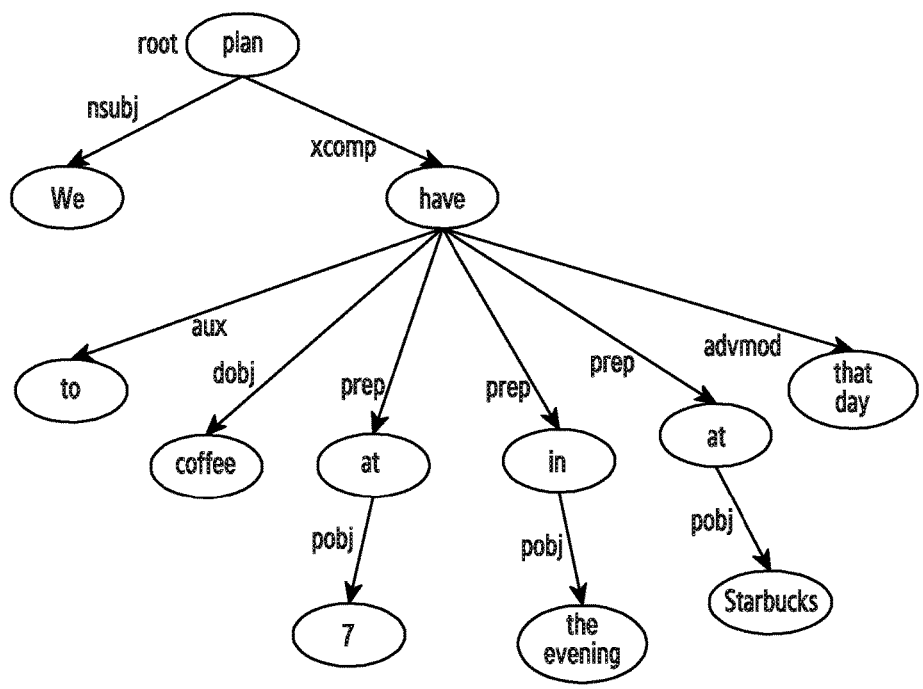
FIG. 7I shows another example scenario of syntactic parsing according to an embodiment of the present disclosure.

FIG. 7I shows another example scenario of syntactic parsing according to an embodiment of the present disclosure.

Referring to FIG. 7I, the syntactic parser generates a parse tree for the sentence "We plan to have coffee at 7 in the evening at Starbucks that day. Further, the syntactic parser extracts and links the different lexical entries based on the relationship between them.

Figure 7J:
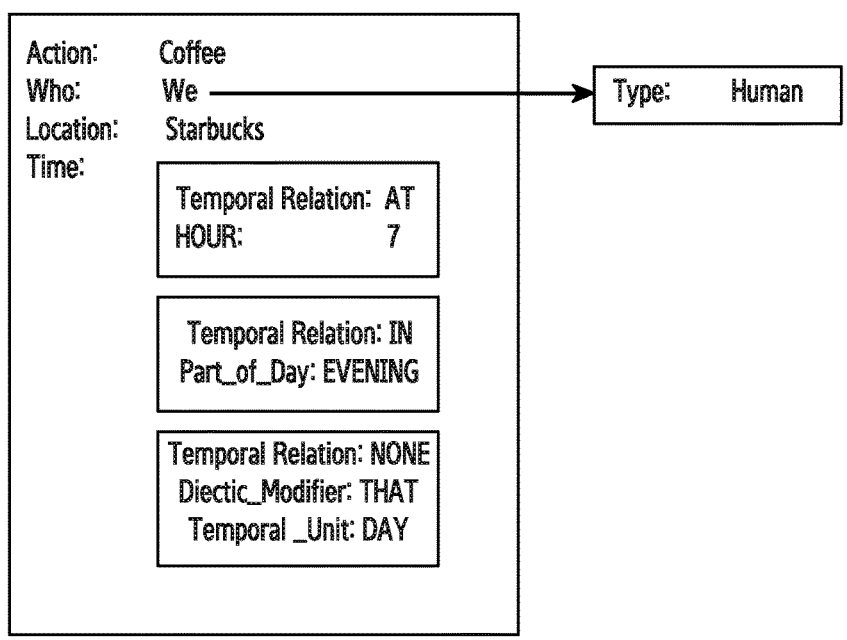
FIG. 7J shows another example scenario of semantic representation creation according to an embodiment of the present disclosure.

FIG. 7J shows another example scenario of semantic representation creation according to an embodiment of the present disclosure.

Referring to FIG. 7J, based on the pre-parsing of the textual information, the LE unit 106 uses the relationships among the different lexical entries and generates a first level of semantic interpretation.

Figure 7K:
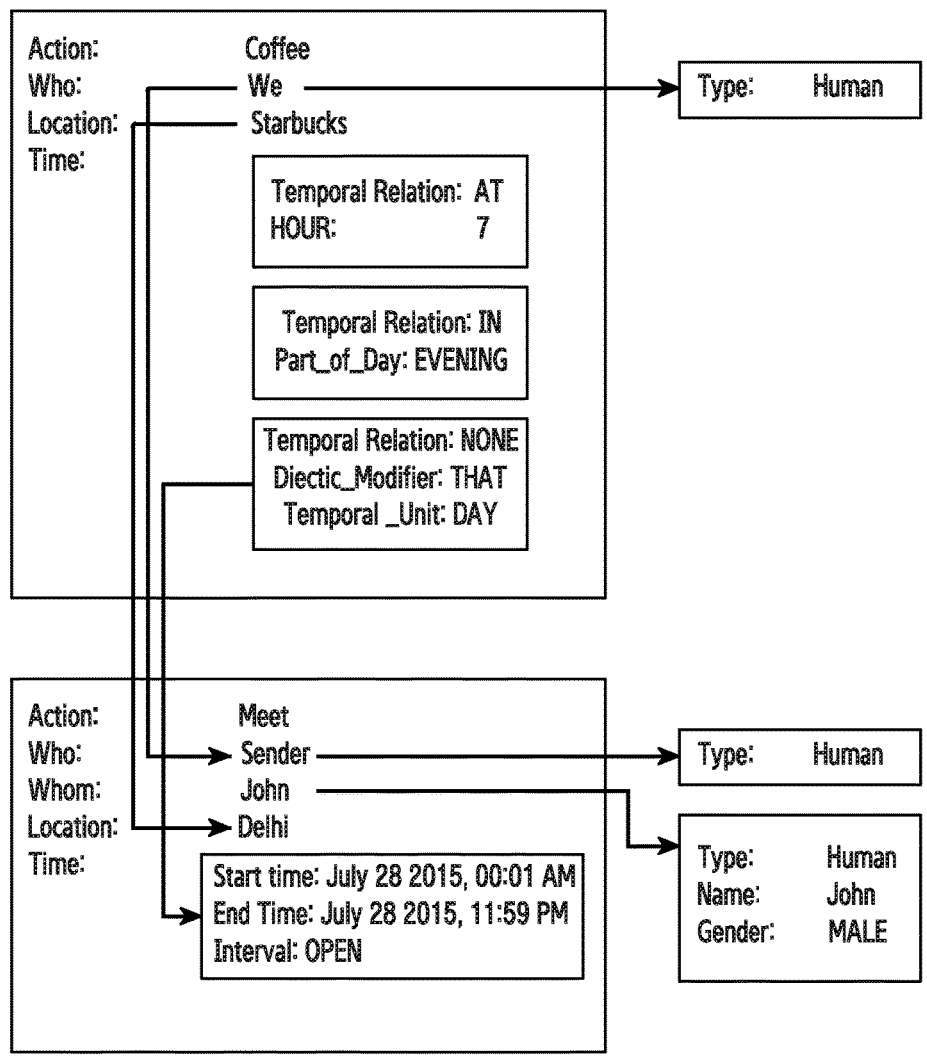
FIG. 7K shows another example scenario of merging semantic representations according to an embodiment of the present disclosure.

FIG. 7K shows another example scenario of merging semantic representations according to an embodiment of the present disclosure.

Referring to FIG. 7K, the CE unit 108 merges the plurality of semantic representation to generate an appropriate semantic interpretation.

Figure 7L:
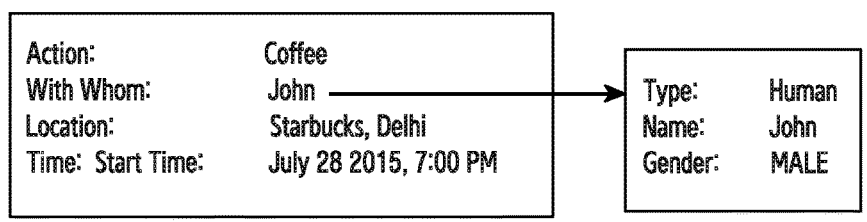
FIG. 7L shows another example scenario of context extraction according to an embodiment of the present disclosure.

FIG. 7L shows another example scenario of context extraction according to an embodiment of the present disclosure.

Referring to FIG. 7L, the CE unit 108 extracts contextual information from the generated semantic representation.

FIG. 7M shows an example scenario of automatically converting note-to-self to action reminders based on semantic representation according to an embodiment of the present disclosure.

Referring to FIG. 7M, the CE unit 108 extracts the context information from the generated semantic interpretation and disambiguates ambiguous sentence, phrases in context to generate an appropriate reminder.

Figure 8:
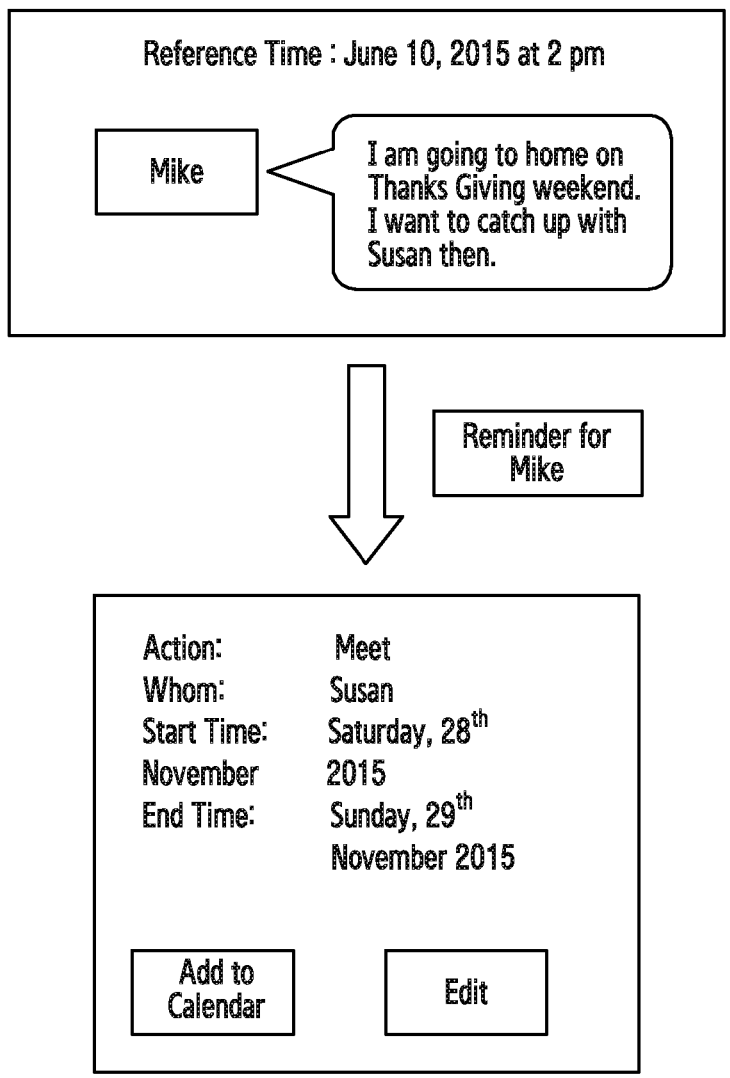
FIG. 8 shows an example scenario of automatically converting note-to-self to action reminders according to an embodiment of the present disclosure.

FIG. 8 shows an example scenario of automatically converting note-to-self to action reminders according to an embodiment of the present disclosure. In an example, the user of the electronic device 100 inputs textual information "I am going to home on Thanksgiving weekend. I want to catch up with Susan then. Further, the input textual information will be converted to reminder as shown in FIG. 8.

Figure 9:
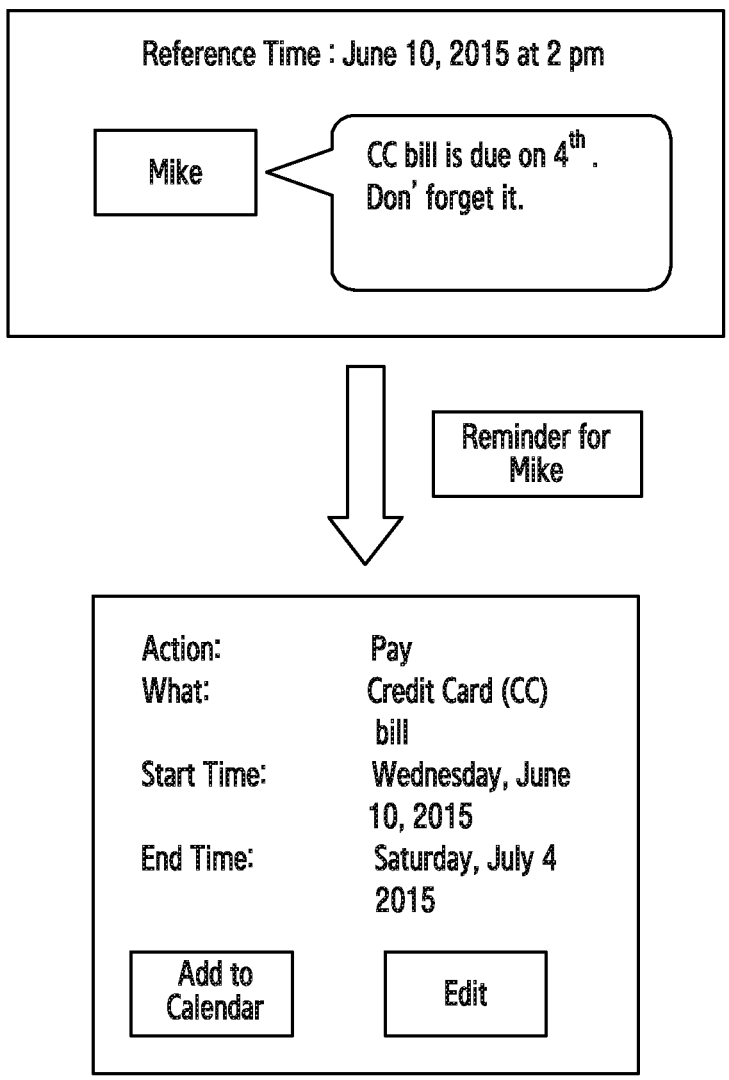
FIG. 9 shows another example scenario of automatically converting note-to-self to action reminders according to an embodiment of the present disclosure.

FIG. 9 shows another example scenario of automatically converting note-to-self to action reminders according to an embodiment of the present disclosure.

Referring to FIG. 9, in another example, the user of the electronic device 100 inputs textual information "Credit Card (CC) bill is due on 4th. Don't forget it. Further, the input textual information will be converted to reminder as shown in FIG. 9.

Figure 10:
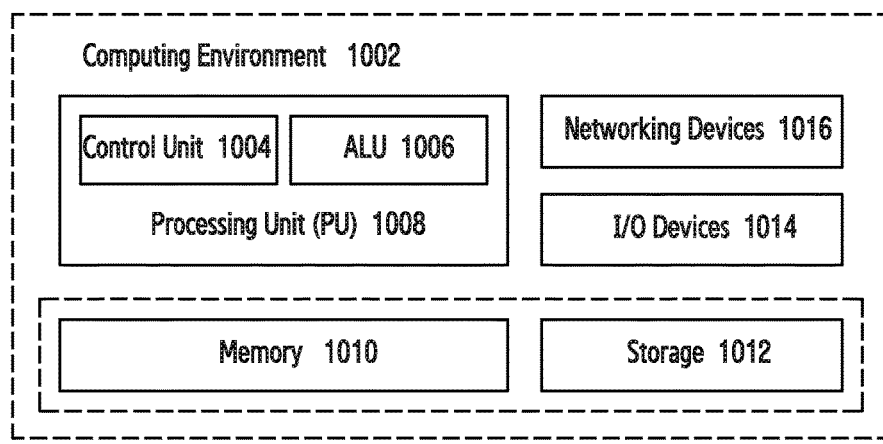
FIG. 10 illustrates a computing environment implementing the method for automatically converting note-to-self to action reminders in an electronic device according to of the present disclosure.

FIG. 10 illustrates a computing environment implementing the method for automatically converting note-to-self to action reminders in an electronic device according to an embodiment of the present disclosure.

Referring to FIG. 10, as depicted the computing environment 1002 comprises at least one processing unit 1008 that is equipped with a control unit 1004 and an arithmetic logic unit (ALU) 1006, a memory 1010, a storage unit 1012, plurality of networking devices 1016 and a plurality input/output (I/O) devices 1014. The processing unit 1008 is responsible for processing the instructions of the algorithm. The processing unit 1008 receives commands from the control unit 1004 in order to perform its processing. Further, any logical and arithmetic operations involved in the execution of the instructions are computed with the help of the ALU 1006.

The various embodiments disclosed herein can be implemented through at least one software program running on at least one hardware device and performing network management functions to control the elements. The elements shown in FIGS. 1 and 10 include blocks which can be at least one of a hardware device, or a combination of hardware device and software module.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method implemented in an electronic device, the method comprising:

receiving an input corresponding to a first sentence comprising at least one word in the electronic device;

determining, by at least one processor, a first context based on the first sentence;

identifying, by the at least one processor, a deictic representation included in the first sentence, wherein the deictic representation corresponds to at least one field of a purpose field, a spatial field, a temporal field, or a participant field of the first context;

performing, by the at least one processor, matching between the first context and at least one second context based on assigning at least one field of the at least one second context to the at least one field of the first context, wherein the at least one second context is determined based on at least one second sentence obtained in the electronic device; and determining, by the at least one processor, a third context based on merging the first context with at least one context among the at least one second context, wherein the at least one context to be merged is compatible or best matched with the first context among the at least one second context, and wherein the third context is used to fill in information missing from at least one of the first sentence or the second sentence.

2. The method of claim 1, wherein the matching between the first context and the at least one second context comprises:

determining gender information based on a generalized ontology or cardinality information based on a number of components belonging to a specific set.

3. The method of claim 1, wherein the determining of the first context comprises:

converting each of the at least one word of the first sentence to a canonical representation;

generating a plurality of semantic representations from the canonical representation; and determining the first context based on the plurality of semantic representations.

4. The method of claim 1, wherein the matching between the first context and the at least one second context comprises:
   determining a degree of match between the first context and the at least one second context based on the deictic representation; and
   determining a fourth context by merging an attribute value included in the first context and the at least one second context.

5. The method of claim 4, wherein the determining of the third context comprises:
   performing at least one of appending, overriding, or negating for the attribute value included in the first context and the at least one second context.

6. An electronic device configured to:
   receive an input corresponding to a first sentence comprising at least one word in the electronic device;
   determine, by at least one processor, a first context based on the first sentence;
   identify, by the at least one processor, a deictic representation included in the first sentence, wherein the deictic representation corresponds to at least one field of a purpose field, a spatial field, a temporal field, or a participant field of the first context;
   perform, by the at least one processor, matching between the first context and at least one second context based on assigning at least one field of the at least one second context to the at least one field of the first context, wherein the at least one second context is determined based on at least one second sentence obtained in the electronic device; and
   determine, by the at least one processor, a third context based on merging the first context with at least one context among the at least one second context,
   wherein the at least one context to be merged is compatible or best matched with the first context among the at least one second context, and
   wherein the third context is used to fill in information missing from at least one of the first sentence or the second sentence.

7. The electronic device of claim 6, wherein the electronic device is further configured to:
   determine, by the at least one processor, gender information based on a generalized ontology or cardinality information based on a number of components belonging to a specific set.

8. The electronic device of claim 6, wherein the electronic device is further configured to:
   convert, by the at least one processor, each of the at least one word of the first sentence to a canonical representation;
   generate, by the at least one processor, a plurality of semantic representations from the canonical representation; and
   determine, by the at least on processor, the first context based on the plurality of semantic representations.

9. The electronic device of claim 8, wherein the electronic device is further configured to:
   determine, by the at least one processor, a degree of match between the first context and the at least one second context based on the deictic representation; and
   determine, by the at least one processor, a third context by merging an attribute value included in the first context and the at least one second context.

10. The electronic device of claim 9, wherein the electronic device is further configured to:
    perform, by the at least one processor, at least one of appending, overriding, or negating for the attribute value included in the first context and the at least one second context.

11. The method of claim 1, the method further comprising generating, by the at least one processor, a reminder comprising information including at least one of activity type, purpose, location, time, or participant based on the third context.

12. The method of claim 1,
    wherein the identifying of the deictic representation comprises identifying an anaphora representation and the deictic representation, and
    wherein the anaphora representation corresponds to the at least one field of the purpose field, the spatial field, the temporal field, or the participant field of the first context.

13. The electronic device of claim 6, wherein the electronic device is further configured to:
    generate, by the at least one processor, a reminder comprising information including at least one of activity type, purpose, location, time, or participant based on the third context.

14. The electronic device of claim 6,
    wherein the electronic device is further configured to:
    identify an anaphora representation and the deictic representation, and
    wherein the anaphora representation corresponds to the at least one field of the purpose field, the spatial field, the temporal field, or the participant field for the first context.

15. The method of claim 1, wherein the third context is used to fill in the information missing from a semantic representation of the at least one of the first sentence or the second sentence.

16. The electronic device of claim 6, wherein the third context is used to fill in the information missing from a semantic representation of the at least one of the first sentence or the second sentence.

* * * * *